US009005558B2

(12) United States Patent
Watanabe et al.

(10) Patent No.: US 9,005,558 B2
(45) Date of Patent: Apr. 14, 2015

(54) METHOD AND APPARATUS FOR EXHAUST GAS CONTROL OF AN INTERNAL COMBUSTION ENGINE

(75) Inventors: Masao Watanabe, Susono (JP); Shigeharu Takagi, Miyoshi (JP); Keisuke Kishita, Nagoya (JP); Noboru Otake, Toyota (JP); Akira Morikawa, Nagoya (JP); Takuto Hirose, Seto (JP); Yasutaka Nagai, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/122,765

(22) PCT Filed: May 30, 2012

(86) PCT No.: PCT/IB2012/001058
§ 371 (c)(1),
(2), (4) Date: Jan. 30, 2014

(87) PCT Pub. No.: WO2012/164379
PCT Pub. Date: Dec. 6, 2012

(65) Prior Publication Data
US 2014/0134087 A1 May 15, 2014

(30) Foreign Application Priority Data

Jun. 1, 2011 (JP) .................................. 2011-123660

(51) Int. Cl.
| | |
|---|---|
| *B01D 53/94* | (2006.01) |
| *F01N 3/10* | (2006.01) |
| *F01N 3/18* | (2006.01) |
| *F01N 3/22* | (2006.01) |
| *F01N 9/00* | (2006.01) |
| *F02D 41/02* | (2006.01) |
| *F01N 13/00* | (2010.01) |

(52) U.S. Cl.
CPC ................ *F01N 3/225* (2013.01); *F01N 9/002* (2013.01); *Y02T 10/47* (2013.01); *F02D 41/027* (2013.01); *F02D 2200/0802* (2013.01); *B01D 53/9431* (2013.01); *B01D 53/9459* (2013.01); *F01N 13/011* (2014.06)

(58) Field of Classification Search
USPC .............. 423/213.2, 213.7; 60/274, 277, 285, 60/295, 299, 301; 422/108
See application file for complete search history.

(56) References Cited

U.S. PATENT DOCUMENTS

| | | | | |
|---|---|---|---|---|
| 4,197,214 | A | 4/1980 | Chen et al. | |
| 5,119,629 | A * | 6/1992 | Kume et al. | 60/274 |
| 5,551,231 | A | 9/1996 | Tanaka et al. | |
| 6,651,422 | B1 * | 11/2003 | LeGare | 60/277 |
| 6,672,051 | B2 * | 1/2004 | Tamura et al. | 60/285 |
| 6,892,527 | B2 * | 5/2005 | Ueda et al. | 60/277 |
| 7,159,385 | B2 * | 1/2007 | Uchida | 60/277 |
| 8,347,614 | B2 * | 1/2013 | Andersen et al. | 60/299 |
| 2004/0074226 | A1 | 4/2004 | Tanaka | |
| 2007/0089398 | A1 * | 4/2007 | Fujiwara et al. | 60/277 |
| 2008/0245056 | A1 | 10/2008 | Kawakita et al. | |

FOREIGN PATENT DOCUMENTS

| | | |
|---|---|---|
| EP | 2 112 340 | 10/2009 |
| JP | 50-45771 | 4/1975 |
| JP | 62-4175 | 1/1987 |
| JP | 62-106826 | 5/1987 |
| JP | 62-153546 | 7/1987 |
| JP | 63-283727 | 11/1988 |
| JP | 5-87219 | 11/1993 |
| JP | 06-126184 | 5/1994 |
| JP | 7-145725 | 6/1995 |
| JP | 07-166851 | 6/1995 |
| JP | 7-185344 | 7/1995 |
| JP | 2001-3733 | 1/2001 |
| JP | 2004-76682 | 3/2004 |
| JP | 2004-137908 | 5/2004 |
| JP | 2004-138031 | 5/2004 |
| JP | 2007-211687 | 8/2007 |
| JP | 2008-255973 | 10/2008 |
| JP | 2009-264282 | 11/2009 |

\* cited by examiner

*Primary Examiner* — Timothy Vanoy
(74) *Attorney, Agent, or Firm* — Finnegan, Henderson, Farabow, Garrett & Dunner, LLP

(57) ABSTRACT

An exhaust gas control apparatus for an internal combustion engine includes: a NOx purification catalyst arranged in an exhaust passage of the internal combustion engine; a degradation degree estimating unit estimating a degradation degree of the NOx purification catalyst; and an air-fuel ratio control unit adjusting an air-fuel ratio of exhaust gas flowing into the NOx purification catalyst, wherein, until the estimated degradation degree of the NOx purification catalyst reaches a predetermined degradation degree, the air-fuel ratio control unit adjusts the air-fuel ratio of the exhaust gas to a rich air-fuel ratio, and, when the estimated degradation degree of the NOx purification catalyst exceeds the predetermined degradation degree, the air-fuel ratio control unit changes the air-fuel ratio of the exhaust gas from the rich air-fuel ratio to a lean air-fuel ratio so that the NOx purification catalyst is regenerated.

12 Claims, 7 Drawing Sheets

METHOD AND APPARATUS FOR EXHAUST GAS CONTROL OF AN INTERNAL COMBUSTION ENGINE

CROSS-REFERENCE TO RELATED APPLICATIONS

This application is a national phase application of International Application No. PCT/IB2012/001058, filed May 30, 2012, and claims the priority of Japanese Application No. 2011-123660, filed Jun. 1, 2011, the content of both of which is incorporated herein by reference.

BACKGROUND OF THE INVENTION

1. Field of the Invention

The invention relates to an exhaust gas control apparatus and exhaust gas control method for an internal combustion engine.

2. Description of Related Art

It is known that a NOx purification catalyst is used as a technique for purifying exhaust gas emitted from an internal combustion engine, such as a gasoline engine and a diesel engine. However, precious metals generally used as a catalytic component of such a NOx purification catalyst, that is, for example, platinum group elements, such as rhodium (Rh), are increasingly used with tightening of emission regulations of automobiles and, therefore, exhaustion of resources is concerned. Therefore, it is necessary to reduce the usage of platinum group elements and to substitute other metals, or the like, for the platinum group elements in the future.

Then, there are many researches for reducing the usage of platinum group elements or for catalytic components as a substitute for the platinum group elements. Copper (Cu) is one of such catalytic components. Some suggestions about a NOx purification catalyst using copper and an exhaust gas control apparatus for an internal combustion engine, which includes such a NOx purification catalyst, are made (see, for example, Japanese Patent Application Publication No. 2001-003733 (JP 2001-003733 A)).

Generally, base metals, such as Cu, have a lower reducing ability than precious metals, such as Rh, in a lean atmosphere having excessive oxygen or in an atmosphere having near a stoichiometric air-fuel ratio. Therefore, it is difficult to sufficiently reduce and purify NOx contained in exhaust gas when the air-fuel ratio of the exhaust gas is lean or stoichiometric. Thus, for example, when Cu is used as the catalyst metal of a NOx purification catalyst, it is generally desirable to adjust the air-fuel ratio of exhaust gas to a rich atmosphere. However, Cu has a lower heat stability than precious metals, and the like, so, even when Cu is used in such a rich atmosphere, there is inconvenience that, as Cu is exposed to high temperatures for an extended period of time, Cu particles tend to agglomerate and form large particles. Then, Cu particles grown in this way cannot maintain a large contact area with exhaust gas any more and, as a result, the NOx conversion performance of the NOx purification catalyst decreases.

SUMMARY OF THE INVENTION

The invention provides an exhaust gas control apparatus and exhaust gas control method for an internal combustion engine, which are able to suppress a decrease in NOx conversion performance due to agglomeration of Cu particles of a NOx purification catalyst that contains Cu as a catalyst metal with a new configuration.

A first aspect of the invention relates to an exhaust gas control apparatus for an internal combustion engine. The exhaust gas control apparatus includes: at least one NOx purification catalyst that is arranged in an exhaust passage of the internal combustion engine and that is formed by supporting Cu on a catalyst carrier; at least one degradation degree estimating unit that is used to estimate a degradation degree of the at least one NOx purification catalyst; and an air-fuel ratio control unit that is used to adjust an air-fuel ratio of exhaust gas flowing into the at least one NOx purification catalyst, wherein, until the degradation degree of the at least one NOx purification catalyst, estimated by the at least one degradation degree estimating unit, reaches a predetermined degradation degree, the air-fuel ratio control unit adjusts the air-fuel ratio of the exhaust gas flowing into the at least one NOx purification catalyst to an air-fuel ratio richer than a stoichiometric air-fuel ratio, and, when the degradation degree of the at least one NOx purification catalyst, estimated by the at least one degradation degree estimating unit, exceeds the predetermined degradation degree, the air-fuel ratio control unit changes the air-fuel ratio of the exhaust gas flowing into the at least one NOx purification catalyst from the air-fuel ratio richer than the stoichiometric air-fuel ratio to an air-fuel ratio leaner than the stoichiometric air-fuel ratio to thereby regenerate the at least one NOx purification catalyst.

In the exhaust gas control apparatus according to the above aspect of the invention, the at least one NOx purification catalyst may be regenerated at a temperature higher than or equal to 500° C.

In the exhaust gas control apparatus according to the above aspect, at least two of the NOx purification catalysts may be provided, the NOx purification catalysts may be arranged in the exhaust passage of the internal combustion engine in parallel with each other and are connected to one common exhaust passage on a downstream side thereof, and, when one of the NOx purification catalysts is being regenerated, the other at least one NOx purification catalyst may purify NOx.

In the exhaust gas control apparatus according to the above aspect, the at least one degradation degree estimating unit may be a NOx sensor that is arranged in an exhaust passage downstream of the at least one NOx purification catalyst.

The exhaust gas control apparatus according to the above aspect may further include: at least one catalyst temperature detecting unit that is used to detect a temperature of the at least one NOx purification catalyst; and at least one catalyst heating unit that is used to heat the at least one NOx purification catalyst, wherein, when any one of the at least one NOx purification catalyst is regenerated, the any one of the at least one NOx purification catalyst may be heated by the at least one catalyst heating unit to a temperature higher than or equal to 500° C.

The exhaust gas control apparatus according to the above aspect may further include: an oxidation catalyst that is arranged in an exhaust passage downstream of the at least one NOx purification catalyst or in a common exhaust passage and that is used to oxidize and purify HC and CO; and an air introducing unit that is arranged in the exhaust passage downstream of the at least one NOx purification catalyst or in the common exhaust passage and that is used to introduce air to the exhaust gas present upstream of the oxidation catalyst.

In the exhaust gas control apparatus according to the above aspect, the oxidation catalyst may be a catalyst formed by supporting Ag on a catalyst carrier.

A second aspect of the invention relates to an exhaust gas control method for an internal combustion engine in which at least one NOx purification catalyst formed by supporting Cu on a catalyst carrier is arranged in an exhaust passage of the internal combustion engine. The exhaust gas control method includes: estimating a degradation degree of the at least one NOx purification catalyst; until the estimated degradation degree of the at least one NOx purification catalyst reaches a predetermined degradation degree, adjusting an air-fuel ratio of exhaust gas flowing into the at least one NOx purification catalyst to an air-fuel ratio richer than a stoichiometric air-fuel ratio; and, when the estimated degradation degree of the at least one NOx purification catalyst exceeds the predetermined degradation degree, changing the air-fuel ratio of the exhaust gas flowing into the at least one NOx purification catalyst from the air-fuel ratio richer than the stoichiometric air-fuel ratio to an air-fuel ratio leaner than the stoichiometric air-fuel ratio to thereby regenerate the at least one NOx purification catalyst.

With the exhaust gas control apparatus and exhaust gas control method for an internal combustion engine, according to the above aspects of the invention, when it is determined that the degradation degree of the NOx purification catalyst that contains Cu as a catalyst metal exceeds the predetermined degradation degree, regeneration treatment for changing the air-fuel ratio of exhaust gas flowing into the NOx purification catalyst from the air-fuel ratio richer than the stoichiometric air-fuel ratio to the air-fuel ratio leaner than the stoichiometric air-fuel ratio is carried out to thereby make it possible to easily recover the NOx purification catalyst from a degraded state to a highly activated state. Furthermore, according to the above aspect, when two NOx purification catalysts are arranged in the exhaust passage of the internal combustion engine in parallel with each other, while one of the NOx purification catalysts is being regenerated, the other NOx purification catalyst is able to reliably reduce and purify NOx in exhaust gas. Thus, with the exhaust gas control apparatus and exhaust gas control method for an internal combustion engine according to the aspects of the invention, it is possible to maintain the high NOx conversion performance of the NOx purification catalyst constantly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An exhaust gas control apparatus for an internal combustion engine according to an embodiment of the invention includes: at least one NOx purification catalyst that is arranged in an exhaust passage of the internal combustion engine and that is formed by supporting Cu on a catalyst carrier; at least one degradation degree estimating unit that estimates a degradation degree of the at least one NOx purification catalyst; and an air-fuel ratio control unit that adjusts an air-fuel ratio of exhaust gas flowing into the at least one NOx purification catalyst. The air-fuel ratio of the exhaust gas flowing into the at least one NOx purification catalyst is adjusted to an air-fuel ratio richer than a stoichiometric air-fuel ratio by the air-fuel ratio control unit until the degradation degree of the at least one NOx purification catalyst, estimated by the at least one degradation degree estimating unit, reaches a predetermined degradation degree, and, when the degradation degree of the at least one NOx purification catalyst, estimated by the at least one degradation degree estimating unit, exceeds the predetermined degradation degree, the air-fuel ratio of the exhaust gas flowing into the at least one NOx purification catalyst is changed by the air-fuel ratio control unit from the air-fuel ratio richer than the stoichiometric air-fuel ratio to an air-fuel ratio leaner than the stoichiometric air-fuel ratio to thereby regenerate the at least one NOx purification catalyst.

A base metal, such as Cu, cannot sufficiently reduce and purify NOx contained in exhaust gas when the air-fuel ratio of the exhaust gas is lean or stoichiometric as described above. Thus, when such a base metal is used as the catalyst metal of a NOx purification catalyst, it is generally desirable to adjust the air-fuel ratio of exhaust gas to a rich atmosphere. However, for example, even when Cu is used in such a rich atmosphere, there is inconvenience that, as Cu is exposed to high temperatures, particularly, high temperatures at or above about 700° C., for an extended period of time, Cu particles tend to agglomerate and form large particles. Then, Cu particles grown in this way cannot maintain a large contact area with exhaust gas any more and, as a result, the NOx conversion performance of the NOx purification catalyst decreases with time.

Figure 1:
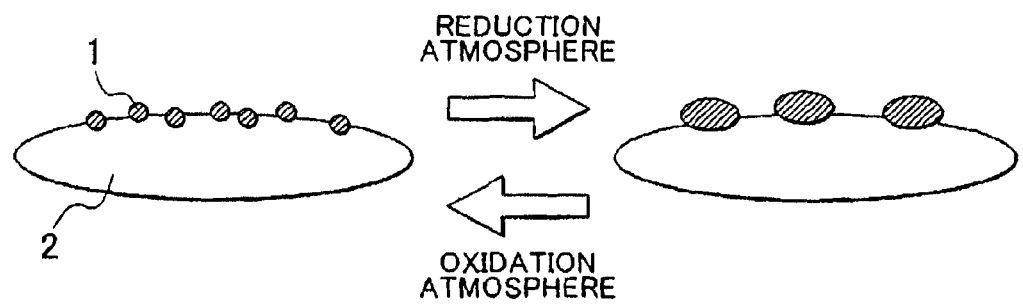
FIG. 1 is a view that schematically shows agglomeration and redispersion of a NOx purification catalyst that contains Cu.

The inventors found that, as schematically shown in FIG. 1, when a NOx purification catalyst that is formed by supporting Cu particles 1 on a catalyst carrier 2 is exposed to a high-temperature reduction atmosphere (corresponding to an air-fuel ratio richer than the stoichiometric air-fuel ratio), the Cu particles 1 on the catalyst carrier 2 agglomerate to decrease the NOx conversion efficiency of the NOx purification catalyst. However, this NOx purification catalyst is exposed to an oxidation atmosphere, corresponding to an air-fuel ratio leaner than the stoichiometric air-fuel ratio, at a predetermined temperature, generally, a temperature of at or above about 500° C., particularly, at or above about 600° C. to cause the agglomerated Cu particles 1 to be redispersed into extremely fine atomic-level particles. Furthermore, the inventors found that, when the NOx purification catalyst having the thus redispersed Cu particles is used in a rich atmosphere again, the NOx conversion efficiency of the NOx purification catalyst is recovered to a high level, that is, the NOx purification catalyst may be regenerated from a degraded state into a highly activated state.

Here, it is generally known that a catalyst metal generally used in an exhaust gas purification catalyst, such as a NOx purification catalyst, has a property of causing so-called sintering such that, as the catalyst metal is exposed to high temperatures for an extended period of time, the catalyst metal moves on the catalyst carrier to form large particles. However, it has not been known that, when, for example, Cu is used as the catalyst metal, Cu particles agglomerated at high temperatures may be redispersed into fine particles by changing the atmosphere. Thus, it is extremely unexpected and surprising that a NOx purification catalyst degraded because of agglomeration of Cu particles may be regenerated into a highly activated state by exposing the degraded NOx purification catalyst to an oxidation atmosphere as described above.

Note that, according to the embodiment of the invention, the NOx purification catalyst may be a material that is formed by supporting Cu on any metal oxide generally used as the catalyst carrier of the NOx purification catalyst, such as alumina ($Al_2O_3$), zirconia ($ZrO_2$), ceria ($CeO_2$), ceria-zirconia ($CeO_2$—$ZrO_2$), silica ($SiO_2$) and titania ($TiO_2$).

Hereinafter, embodiments of the exhaust gas control apparatus for an internal combustion engine according to the aspects of the invention will be described in detail with reference to the accompanying drawings. However, the following description intends to merely illustrate the embodiments of the aspects of the invention and does not intend to limit the aspects of the invention to such specific embodiments.

Figure 2:
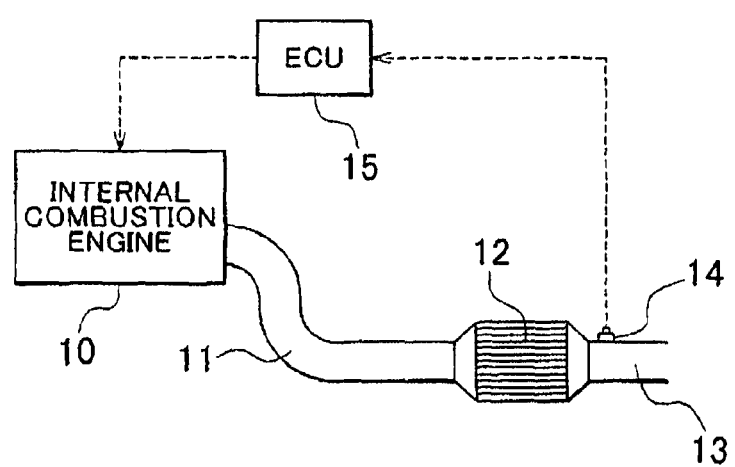
FIG. 2 is a view that schematically shows an exhaust gas control apparatus according to a first embodiment of the invention.

FIG. 2 is a view that schematically shows an exhaust gas control apparatus according to a first embodiment of the invention.

As shown in FIG. 2, the exhaust side of an internal combustion engine 10 is connected via an exhaust passage 11 to a NOx purification catalyst 12 that contains Cu as a catalyst metal, and the outlet portion of the NOx purification catalyst 12 is further connected to an exhaust passage 13. In addition, in the first embodiment of the invention, a NOx sensor 14 (degradation degree estimating unit) is installed in the exhaust passage 13. The NOx sensor 14 is used to detect NOx in exhaust gas flowing out from the NOx purification catalyst 12. Then, the air-fuel ratio of exhaust gas may be adjusted by an electronic control unit (ECU) 15 (air-fuel ratio control unit) on the basis of the amount of NOx in exhaust gas, detected by the NOx sensor 14.

According to the present embodiment, during normal times, the air-fuel ratio of exhaust gas flowing into the NOx purification catalyst 12 is adjusted by the ECU 15 to an air-fuel ratio richer than the stoichiometric air-fuel ratio, and NOx in exhaust gas is reduced and purified by the NOx purification catalyst 12. On the other hand, at high temperatures, such as during accelerating and during high-speed running, Cu particles may agglomerate and the catalytic activity of the NOx purification catalyst 12 may gradually degrade. Then, when the degradation degree of the NOx purification catalyst 12 exceeds a predetermined degradation degree, the ECU 15 changes the air-fuel ratio of exhaust gas flowing into the NOx purification catalyst 12 from an air-fuel ratio richer than the stoichiometric air-fuel ratio to an air-fuel ratio leaner than the stoichiometric air-fuel ratio. By so doing, the NOx purification catalyst 12 is regenerated.

More specifically, for example, by determining whether the amount of NOx in exhaust gas, detected by the NOx sensor 14 located downstream of the NOx purification catalyst 12, exceeds a predetermined value or determining whether the NOx conversion efficiency calculated on the basis of the amount of NOx is lower than a predetermined value, it is possible to determine whether the degradation degree of the NOx purification catalyst 12 exceeds the predetermined degradation degree. Then, when it is determined that the degradation degree of the NOx purification catalyst 12 exceeds the predetermined degradation degree, the ECU 15, for example, adjusts the amount of fuel injected from a fuel injection valve (not shown) (hereinafter, referred to as "fuel injection amount"). By so doing, the air-fuel ratio of exhaust gas flowing into the NOx purification catalyst 12 is changed from an air-fuel ratio richer than the stoichiometric air-fuel ratio to an air-fuel ratio leaner than the stoichiometric air-fuel ratio. Then, the atmosphere of exhaust gas flowing into the NOx purification catalyst 12 is maintained in an oxidation atmosphere for a predetermined period of time to thereby regenerate the NOx purification catalyst 12. By so doing, Cu particles agglomerated on the catalyst carrier of the NOx purification catalyst 12 may be redispersed into fine atomic-level particles. Therefore, when the air-fuel ratio of exhaust gas flowing into the NOx purification catalyst 12 after regeneration treatment is returned to a rich air-fuel ratio again, the NOx conversion efficiency of the NOx purification catalyst 12 may be recovered to a high level.

Here, the duration of changing a rich air-fuel ratio of exhaust gas to a lean air-fuel ratio of exhaust gas may be a period of time sufficient to regenerate the NOx purification catalyst 12, more specifically; a period of time sufficient to redisperse the agglomerated Cu particles into fine atomic-level particles. Although not specifically limited, the duration may be generally 1 to 60 minutes, desirably, 1 to 30 minutes, and, more desirably, about 1 to 5 minutes.

Note that, in the present embodiment, the NOx sensor 14 is used as the degradation degree estimating unit for estimating the degradation degree of the NOx purification catalyst 12, and the NOx purification catalyst 12 is regenerated on the basis of the amount of NOx in exhaust gas, detected by the NOx sensor 14. However, the degradation degree estimating unit for estimating the degradation degree of the NOx purification catalyst 12 may be various devices or methods, other than the NOx sensor 14. For example, it is also applicable in the following manner. A temperature sensor for detecting the temperature of the NOx purification catalyst 12 is installed in the casing of the NOx purification catalyst 12 or the exhaust passage 13 at the outlet portion of the NOx purification catalyst 12. A period of time during which the NOx purification catalyst 12 is exposed to a predetermined temperature that is, for example, a temperature higher than or equal to 700° C. is integrated on the basis of the history of the temperature T of the NOx purification catalyst 12, detected by the temperature sensor. When the integrated period of time exceeds a set period of time, it is determined that the degradation degree of the NOx purification catalyst 12 exceeds the predetermined degradation degree. Then, the NOx purification catalyst 12 is subjected to the above described regeneration treatment.

In the exhaust gas control apparatus according to the embodiment of the invention, regeneration treatment is carried out at a predetermined temperature, generally, a temperature higher than or equal to about 500° C., particularly, a temperature higher than or equal to about 600° C. Here, generally, when the NOx purification catalyst 12 used in the exhaust gas control apparatus according to the embodiment of the invention is used at high temperatures, such as during accelerating and during high-speed running, Cu particles, that is, a catalytic component, agglomerate and the catalytic activity of the NOx purification catalyst 12 gradually degrades. Then, such degradation of catalytic activity is particularly remarkable when the NOx purification catalyst 12 is used at high temperatures higher than or equal to about 700° C. Thus, when the NOx purification catalyst 12 is subjected to the above described regeneration treatment, the temperature of the NOx purification catalyst 12 normally has already reached a temperature higher than or equal to about 500° C. Therefore, only by merely changing the air-fuel ratio of exhaust gas flowing into the NOx purification catalyst from a rich air-fuel ratio to a lean air-fuel ratio without the particular necessity of, for example, heating the NOx purification catalyst 12 to a temperature higher than or equal to about 500° C., the agglomerated Cu particles may be redispersed into fine atomic-level particles.

However, for example, when the temperature of the NOx purification catalyst 12 has not reached about 500° C. at the time when degradation of catalytic activity has occurred, it is required to heat the NOx purification catalyst 12 to a temperature higher than or equal to about 500° C. at the time of regeneration treatment. Particularly, for example, when the degree of degradation of the NOx purification catalyst 12 is large, it may be desirable to heat the NOx purification catalyst 12 to a higher temperature, such as a temperature higher than or equal to about 600° C., at the time of regeneration treatment. Thus, in the exhaust gas control apparatus according to the first embodiment of the invention, optionally, as will be described in association with an exhaust gas control apparatus according to a second embodiment of the invention, a temperature sensor (catalyst temperature detecting unit) and an electric heater (catalyst heating unit) may be used to reliably adjust the temperature of the NOx purification catalyst 12 to a temperature higher than or equal to about 500° C., particularly, a temperature higher than or equal to about 600° C., at the time of regeneration treatment.

In the embodiment of the invention, as described above, Cu used as a catalytic component is not able to sufficiently reduce and purify NOx contained in exhaust gas when the air-fuel ratio of the exhaust gas is lean or stoichiometric. Thus, in the above described exhaust gas control apparatus according to the first embodiment of the invention, while the NOx purification catalyst is being regenerated in a lean atmosphere, NOx in exhaust gas may not be sufficiently reduced and purified. Then, the exhaust gas control apparatus according to the second embodiment of the invention is able to reliably reduce and purify NOx in exhaust gas in such a case as well, and will be specifically described below.

Figure 3:
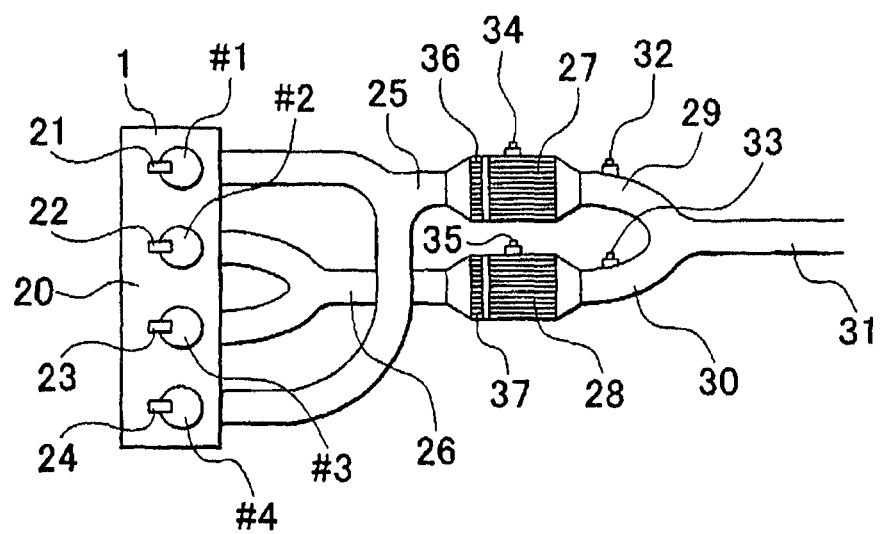
FIG. 3 is a view that schematically shows an exhaust gas control apparatus according to a second embodiment of the invention.

FIG. 3 is a view that schematically shows the exhaust gas control apparatus according to the second embodiment of the invention. In FIG. 3, an internal combustion engine 20 has a first cylinder #1, a second cylinder #2, a third cylinder #3 and a fourth cylinder #4. Fuel injection valves 21, 22, 23 and 24 are provided in correspondence with the respective cylinders. In addition, the first cylinder and the fourth cylinder are connected to a first NOx purification catalyst 27 via an exhaust passage 25, and the second cylinder and the third cylinder are connected to a second NOx purification catalyst 28 via an exhaust passage 26. Then, the outlet portion of the first NOx purification catalyst 27 and the outlet portion of the second NOx purification catalyst 28 are respectively connected to exhaust passages 29 and 30, and these exhaust passages merge into a common exhaust passage 31 on the further downstream side.

In addition, in the exhaust gas control apparatus according to the second embodiment of the invention, NOx sensors 32 and 33 (degradation degree estimating units) are respectively installed in the exhaust passages 29 and 30. The NOx sensors 32 and 33 are respectively used to detect NOx in exhaust gas flowing out from the first NOx purification catalyst 27 and NOx in exhaust gas flowing out from the second NOx purification catalyst 28. Then, the air-fuel ratio of exhaust gas flowing into each of the NOx purification catalysts may be adjusted by an electronic control unit (ECU) (air-fuel ratio control unit) on the basis of the amount of NOx in exhaust gas, detected by a corresponding one of the NOx sensors 32 and 33.

In addition, optionally, temperature sensors 34 and 35 (catalyst temperature detecting units) are respectively installed in the first NOx purification catalyst 27 and the second NOx purification catalyst 28. The temperature sensors 34 and 35 are respectively used to detect the temperatures of these NOx purification catalysts. Note that these temperature sensors 34 and 35 just need to be able to respectively detect the temperature of the first NOx purification catalyst 27 and the temperature of the second NOx purification catalyst 28, and may be, for example, respectively installed in the exhaust passages 29 and 30 connected to the outlet portions of these NOx purification catalysts. Furthermore, in the present embodiment, optionally, electric heaters 36 and 37 that serve as catalyst heating units are respectively arranged upstream of the first NOx purification catalyst 27 and the second NOx purification catalyst 28. The electric heaters 36 and 37 are respectively used to heat these NOx purification catalysts. The electric heater 36 may be, for example, controlled by the ECU (not shown) on the basis of the temperature of the first NOx purification catalyst 27, detected by the temperature sensor 34. The electric heater 37 may be, for example, controlled by the ECU (not shown) on the basis of the temperature of the second NOx purification catalyst 28, detected by the temperature sensor 35.

The catalyst heating units that are respectively used to heat the first NOx purification catalyst 27 and the second NOx purification catalyst 28 may be various devices and methods, other than the electric heaters 36 and 37. For example, the catalyst heating units in the present embodiment of the invention may be the following methods. Ribbon heaters, or the like, are respectively wound around casings that respectively accommodate the first NOx purification catalyst 27 and the second NOx purification catalyst 28 to thereby heat the first NOx purification catalyst 27 and the second NOx purification catalyst 28. Alternatively, current is directly passed through honeycomb base materials, or the like, respectively coated with the first NOx purification catalyst 27 and the second NOx purification catalyst 28 to thereby directly heat the first NOx purification catalyst 27 and the second NOx purification catalyst 28.

Note that, as is described in association with the exhaust gas control apparatus according to the first embodiment of the invention, the catalyst temperature detecting units, such as the temperature sensors, and the catalyst heating units, such as the electric heaters, are not necessarily required at the time of regeneration treatment. Particularly, the catalyst heating units, such as the electric heaters, are not necessarily required at the time of regeneration treatment. Thus, these catalyst temperature detecting units and catalyst heating units may be used where necessary depending on a situation. These catalyst temperature detecting units and catalyst heating units may be used, for example, when the temperature of any one of the NOx purification catalysts has not reached a temperature higher than or equal to about 500° C. and, particularly, when the degree of degradation of any one of the NOx purification catalysts is large and the any one of the NOx purification catalysts is required to be regenerated at a higher temperature.

Figure 4:
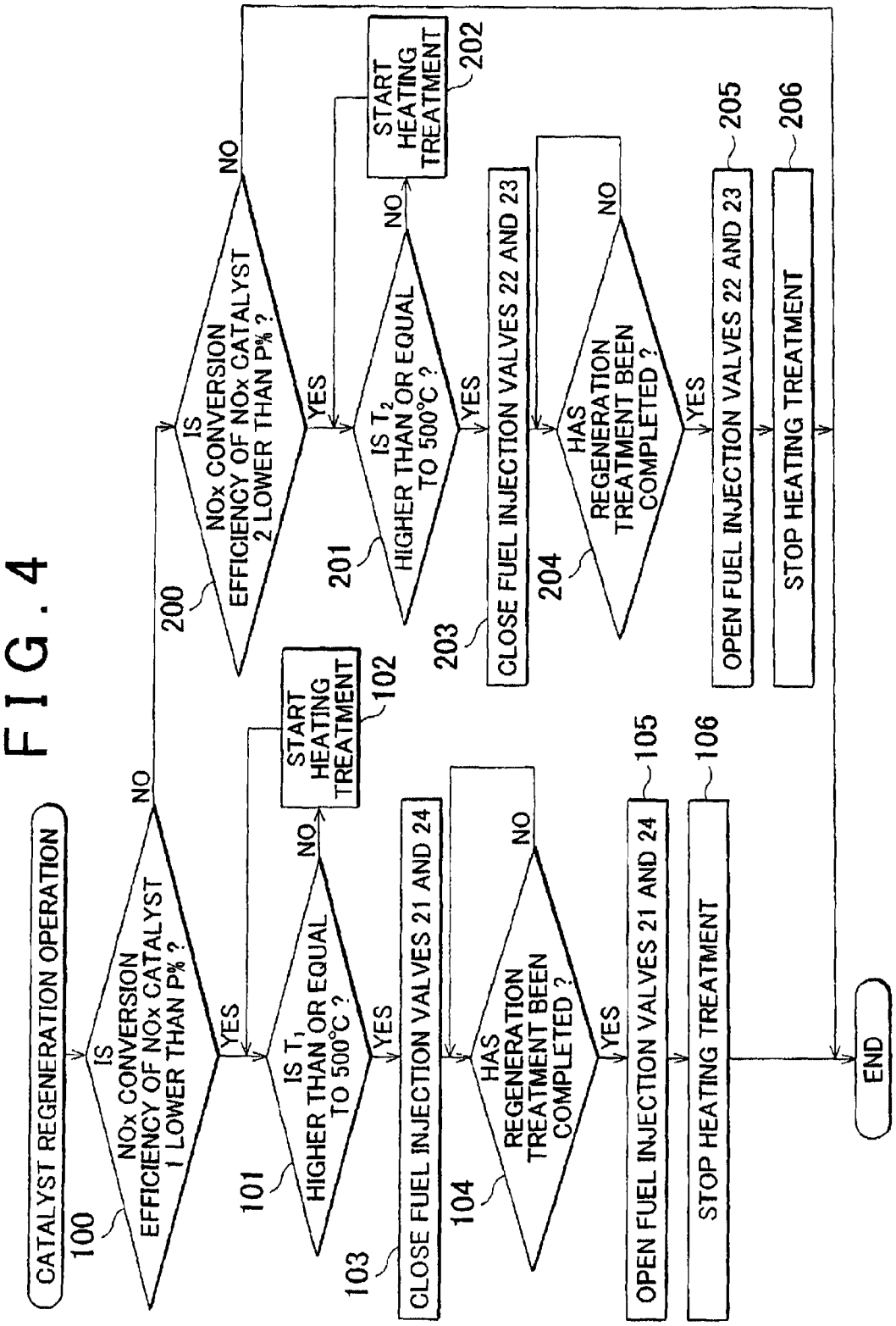
FIG. 4 is a flow chart of catalyst regeneration operation in the exhaust gas control apparatus according to the second embodiment of the invention.

FIG. 4 is a flow chart of catalyst regeneration operation in the exhaust gas control apparatus according to the second embodiment of the invention. Note that the catalyst regeneration operation is an interrupt routine executed by the ECU at predetermined time intervals.

As shown in FIG. 4, initially, in step 100, it is determined whether the NOx conversion efficiency of the first NOx purification catalyst 27 (shown as the NOx catalyst 1 in FIG. 4), calculated on the basis of the amount of NOx in exhaust gas, detected by the NOx sensor 32, is lower than a predetermined value P %. Then, when the NOx conversion efficiency is lower than P %, that is, when the degradation degree of the first NOx purification catalyst 27 exceeds the predetermined degradation degree, the process proceeds to step 101. On the other hand, when the NOx conversion efficiency of the first NOx purification catalyst 27 is higher than or equal to P %, that is, when the first NOx purification catalyst 27 exhibits sufficient catalytic activity, the process proceeds to step 200 and then starts the routine for executing catalyst regeneration operation over the second NOx purification catalyst 28.

Note that, when the NOx purification catalyst formed by supporting Cu on the catalyst carrier, used in the exhaust gas control apparatus according to the embodiment of the invention, is, for example, used at a temperature of about 500° C., the air-fuel ratio (A/F) of exhaust gas flowing into the NOx purification catalyst is adjusted to a rich air-fuel ratio of about 14.0. By so doing, it is possible to achieve a NOx conversion efficiency higher than or equal to about 95%, particularly, substantially 100% or close to 100%. Thus, in the present embodiment, the above described threshold P % used to determine the degradation degree of each of the first NOx purification catalyst 27 and the second NOx purification catalyst 28 may be, for example, set at 90%.

Subsequently, in step 101, it is determined whether the bed temperature T1 of the first NOx purification catalyst 27, detected by the temperature sensor 34, has reached a temperature required of regeneration treatment, that is, 500° C., and, when T1 is higher than or equal to 500° C., the process proceeds to step 103. On the other hand, when the bed temperature T1 of the first NOx purification catalyst 27 has not reached 500° C., that is, when T1 is lower than 500° C., the process proceeds to step 102. Then, in step 102, feeding of current to the electric heater 36 is started to start heating the first NOx purification catalyst 27, and then the process returns to step 101.

Subsequently, in step 103, the fuel injection valve 21 of the first cylinder #1 and the fuel injection valve 24 of the fourth cylinder #4 are closed to cause only air to flow into the first NOx purification catalyst 27 to thereby start regeneration treatment, and then the process proceeds to step 104. In step 104, it is determined whether regeneration treatment has been completed, and, when regeneration treatment has been completed, the process proceeds to step 105. Note that, in determination as to completion of regeneration treatment, for example, it is also applicable in the following manner. A period of time elapsed from when the regeneration treatment is started, that is, when the fuel injection valves 21 and 24 are closed, is measured by, a timer, and then, when the elapsed period of time measured by the timer exceeds a predetermined period of time, it is determined that regeneration treatment has been completed.

Then, after regeneration treatment has been completed, the fuel injection valves 21 and 24 are opened in step 105, and, where necessary, feeding of current to the electric heater 36 (that is, heating treatment) is stopped in step 106, and then the routine for executing catalyst regeneration operation over the first NOx purification catalyst 27 is ended. Note that, in the present embodiment, the fuel injection valves 21 and 24 are closed to completely stop supply of fuel to the first NOx purification catalyst 27 to thereby carry out regeneration treatment. However, regeneration treatment of the NOx purification catalyst is not necessarily limited to such a method. For example, regeneration treatment may be carried out such that the fuel injection amounts from the fuel injection valves 21 and 24 are adjusted so as to be reduced to thereby change the air-fuel ratio of exhaust gas flowing into the first NOx purification catalyst 27 into an air-fuel ratio leaner than the stoichiometric air-fuel ratio.

On the other hand, as described above, when the first NOx purification catalyst 27 sufficiently exhibits catalytic activity in step 100, the process proceeds to step 200 to start the routine for executing catalyst regeneration operation over the second NOx purification catalyst 28. Then, in step 200, it is determined whether the NOx conversion efficiency of the second NOx purification catalyst 28 (shown as the NOx catalyst 2 in FIG. 4), calculated on the basis of the amount of NOx in exhaust gas, detected by the NOx sensor 33, is lower than the predetermined value P %. Then, when the NOx conversion efficiency is lower than P %, that is, when the degradation degree of the second NOx purification catalyst 28 exceeds the predetermined degradation degree, the process proceeds to step 201. Then, catalyst regeneration operation over the second NOx purification catalyst 28 is executed in steps 201, 202, 203, 204, 205 and 206 as in the case of the catalyst regeneration operation over the first NOx purification catalyst 27 (in steps 101, 102, 103, 104, 105 and 106). Note that, in step 200, when the NOx conversion efficiency of the second NOx purification catalyst 28 is higher than or equal to P %, that is, when the second NOx purification catalyst 28 exhibits sufficient catalytic activity, the routine ends without executing catalyst regeneration operation over the second NOx purification catalyst 28.

As described above, according to the present embodiment, during normal times, NOx in exhaust gas may be reduced and purified in both the first NOx purification catalyst 27 and the second NOx purification catalyst 28. Then, when the degradation degree of any one of the first NOx purification catalyst 27 and the second NOx purification catalyst 28 has reached the predetermined degradation degree, only the atmosphere of exhaust gas flowing into the any one of the NOx purification catalysts may be changed to an oxygen excessive lean atmosphere. By so doing, the any one of the NOx purification catalysts is regenerated while NOx in exhaust gas is reliably reduced and purified by the other one of the NOx purification catalysts.

In addition, such regeneration treatment of the NOx purification catalyst receives some influence depending on the degree of degradation of the NOx purification catalyst and the atmosphere, temperature condition, and the like, at the time of regeneration treatment; however, it may be generally completed for about several minutes to several tens of minutes. For example, in the above described exhaust gas control apparatus according to the second embodiment of the invention, in the case where it is determined that any one of the NOx purification catalysts has degraded when the NOx conversion efficiency is lower than 90% and then regeneration treatment of that NOx purification catalyst is started, the regeneration treatment may be completed for about several minutes, particularly, about 3 to 5 minutes.

In this way, with the exhaust gas control apparatus according to the second embodiment of the invention, the threshold of the NOx conversion efficiency at the time of determining whether the NOx purification catalyst is degraded, and the atmosphere, temperature, and the like, at the time of regeneration treatment are appropriately selected. By so doing, it is possible to reliably regenerate the NOx purification catalyst in a relatively short period of time before the catalytic activity of the NOx purification catalyst significantly decreases, so it is possible to stably reduce and purify NOx in exhaust gas.

In addition, in alternative embodiments of the exhaust gas control apparatuses according to the first and second embodiments, for example, an oxidation catalyst that is used to mainly oxidize and purify hydrocarbons (HC) and carbon monoxide (CO) may be arranged in the exhaust passage downstream of the NOx purification catalysts. Such an oxidation catalyst may be any oxidation catalyst known by a person skilled in the art in the technical field of exhaust gas purification catalyst. For example, such an oxidation catalyst may be a known existing three-way catalyst that is formed by supporting a so-called platinum group element, such as platinum (Pt) and palladium (Pd), on the catalyst carrier. Other than the three-way catalyst, for example, an oxidation catalyst that is formed by supporting a metal, such as silver (Ag), on the catalyst carrier may also be used.

Among others, Ag has a high activity against oxidation of HC and CO. Therefore, by using an oxidation catalyst formed by supporting Ag on the catalyst carrier and NOx purification catalysts that contain Cu as a catalytic component in combination, toxic components in exhaust gas, that is, HC, CO and NOx, may be reliably oxidized or reduced and purified. Note that the catalyst carrier for supporting a metal, such as Ag, in the above oxidation catalyst may be any metal oxide generally used as the catalyst carrier of an exhaust gas purification catalyst, such as alumina ($Al_2O_3$), zirconia ($ZrO_2$), ceria ($CeO_2$), ceria-zirconia ($CeO_2$—$ZrO_2$), silica ($SiO_2$) and titania ($TiO_2$).

On the other hand, in the exhaust gas control apparatus according to the embodiment of the invention, as described above, during normal times, the NOx purification catalysts are used in a state where the air-fuel ratio of exhaust gas is adjusted to an air-fuel ratio richer than the stoichiometric air-fuel ratio. However, an oxidation catalyst that is formed by supporting a metal, such as Ag, on the catalyst carrier may not be able to sufficiently oxidize and purify HC and CO contained in exhaust gas in such an atmosphere. Thus, in the exhaust gas control apparatus according to the embodiment of the invention, when the oxidation catalyst that contains a metal, such as Ag, is used, it is desirable that, for example, air is introduced into exhaust gas present upstream of the oxidation catalyst. By so doing, the air-fuel ratio of exhaust gas flowing into the oxidation catalyst is adjusted to the stoichiometric air-fuel ratio or an air-fuel ratio leaner than the stoichiometric air-fuel ratio.

Figure 5:
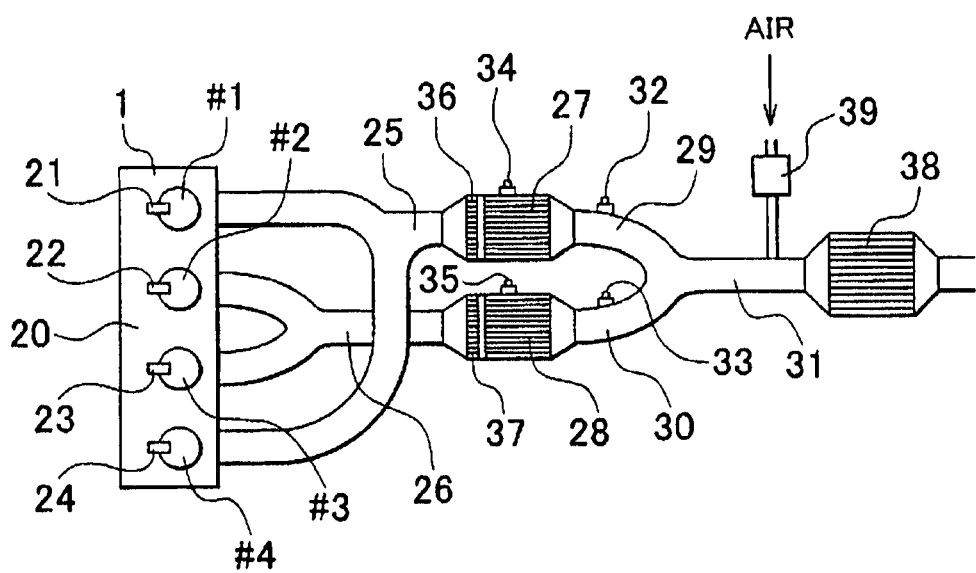
FIG. 5 is a view that schematically shows an alternative embodiment of the exhaust gas control apparatus according to the second embodiment of the invention.

FIG. 5 is a view that schematically shows an alternative embodiment of the exhaust gas control apparatus according to the second embodiment of the invention. As shown in FIG. 5, as in the case of FIG. 3, the outlet portion of a first NOx purification catalyst 27 and the outlet portion of a second NOx purification catalyst 28 are respectively connected to exhaust passages 29 and 30, and these exhaust passages merge into a common exhaust passage 31 on the downstream side. Then, in the exhaust gas control apparatus shown in FIG. 5, an oxidation catalyst 38 is further arranged in the common exhaust passage 31, and a pump 39 (air introducing unit) for introducing air into the exhaust passage 31 is connected upstream of the oxidation catalyst 38. With the thus configured exhaust gas control apparatus, as described in association with FIG. 3 and FIG. 4, NOx in exhaust gas may be reliably reduced and purified by the NOx purification catalysts 27 and 28 while other toxic components, such as HC and CO, in exhaust gas may also be sufficiently oxidized and purified by the oxidation catalyst 38.

Note that FIG. 5 shows a configuration that the oxidation catalyst for oxidizing and purifying HC and CO and the air introducing unit are further added to the exhaust gas control apparatus according to the second embodiment of the invention, and these oxidation catalyst and air introducing unit may also be similarly used in the exhaust gas control apparatus according to the first embodiment of the invention.

Hereinafter, regeneration treatment of the NOx purification catalysts used in the exhaust gas control apparatuses according to the embodiments of the invention will be described in detail on the basis of the experimental results.

[Redispersion of Cu Particles by Regeneration Treatment]

In this experiment, in a Cu supported catalyst used as each of the NOx purification catalysts in the exhaust gas control apparatuses according to the embodiments of the invention, it was tested how an atmosphere to which the catalyst is exposed acts on agglomeration and redispersion of Cu particles. Specifically, a $Cu/Al_2O_3$ catalyst that is formed by supporting copper (Cu) on an alumina ($Al_2O_3$) carrier by impregnation was used as a catalyst sample. The results obtained by exposing the catalyst sample to a reduction atmosphere and an oxidation atmosphere at a predetermined temperature are shown in FIG. 6A to FIG. 6D.

Figure 6:
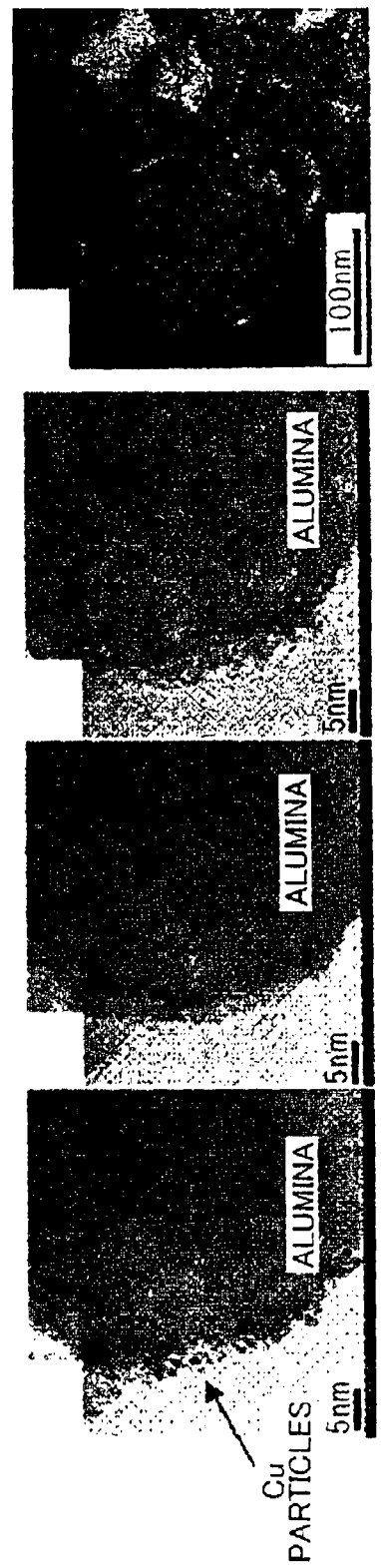
FIG. 6A to FIG. 6D are transmission electron microscope (TEM) photos of $Cu/Al_2O_3$ catalyst.

FIG. 6A to FIG. 6D are transmission electron microscope (TEM) photos of the $Cu/Al_2O_3$ catalyst. FIG. 6A shows a $Cu/Al_2O_3$ catalyst after being subjected to reduction treatment in a reduction atmosphere (1% $H_2/N_2$ balance) at 700° C. for 10 minutes. FIG. 6B shows a $Cu/Al_2O_3$ catalyst after the $Cu/Al_2O_3$ catalyst of FIG. 6A was subjected to oxidation treatment in air at 500° C. for 10 minutes. Furthermore, FIG. 6C shows a $Cu/Al_2O_3$ catalyst after the $Cu/Al_2O_3$ catalyst of FIG. 6B was subjected to reduction treatment in a reduction atmosphere (1% $H_2/N_2$ balance) at 700° C. for 10 minutes. FIG. 6D shows a $Cu/Al_2O_3$ catalyst after the $Cu/Al_2O_3$ catalyst of FIG. 6B was subjected to reduction treatment in a reduction atmosphere (1% $H_2/N_2$ balance) at 700° C. for 50 hours.

First, as shown in FIG. 6A, in the $Cu/Al_2O_3$ catalyst subjected to reduction treatment at 700° C. Cu particles having a particle diameter of about several nm was identified at its peripheral portion. Then, in the $Cu/Al_2O_3$ catalyst of FIG. 6B, subjected to oxidation treatment after reduction treatment in FIG. 6A, it is found that the Cu particles identified in FIG. 6A disappeared. This result indicates that Cu particles agglomerated in a high-temperature reduction atmosphere are redispersed into extremely fine atomic-level particles when being exposed to an oxidation atmosphere having a temperature higher than or equal to 500° C. Then, in the $Cu/Al_2O_3$ catalyst of FIG. 6C, further subjected to reduction treatment after oxidation treatment in FIG. 6B, as in the case of FIG. 6A, agglomeration of Cu particles was identified at its peripheral portion. Then, in the $Cu/Al_2O_3$ catalyst of FIG. 6D, subjected to reduction treatment for 50 hours, as is apparent from the TEM image shown in inverted image, a large number of Cu particles having several tens of nm, particularly, an excess of about 50 nm, (shown as large white area in FIG. 6D) were identified.

[Temporal Change in Catalytic Activity in Endurance Test]

Figure 7:
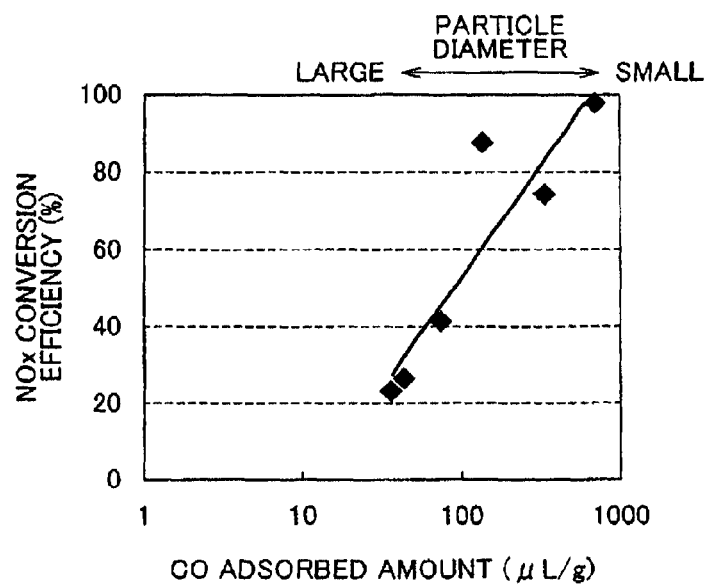
FIG. 7 is a graph that shows the NOx conversion efficiency of each of $Cu/Al_2O_3$ catalysts subjected to reduction treatment for various periods of time.

Next, the NOx conversion efficiency and CO adsorbed amount of each of the $Cu/Al_2O_3$ catalysts subjected to reduction treatment for various periods of time, described in association with FIG. 6A to FIG. 6D, were measured and the relationship among them was evaluated. More specifically, the NOx conversion efficiency of each of 3.0 g $Cu/Al_2O_3$ catalyst (pellet catalyst, Cu supported amount: 5 wt %) subjected to reduction treatment in a 1% $H_2/N_2$ balance reduction atmosphere at 700° C. for a predetermined period of time was measured at the time when evaluation model gas shown in the following Table 1 was flowed through a catalyst bed at a temperature of 500° C. at a flow rate of 15 L/minute and then each $Cu/Al_2O_3$ catalyst reached a steady state. Note that the evaluation model gas shown in the following Table 1 was prepared so as to correspond to exhaust gas having an air-fuel ratio (A/F) of about 14.0. In addition, the CO adsorbed amount of each $Cu/Al_2O_3$ catalyst was measured by a CO pulse adsorption method. The results are shown in FIG. 7.

TABLE 1

Composition of Evaluation Model Gas

| | Composition of Gas | | | | | |
|---|---|---|---|---|---|---|
| NOx (ppm) | $C_3H_6$ (ppmC) | CO (%) | $O_2$ (%) | $CO_2$ (%) | $H_2O$ (%) | $N_2$ |
| Evaluation Model Gas | 3000 | 3000[a] | 0.45 | 0.52 | 10 | 3 | Remaining Part |

[a] The concentration of carbon contained in $C_3H_6$ is indicated.

FIG. 7 is a graph that shows the NOx conversion efficiency of each of the $Cu/Al_2O_3$ catalysts subjected to reduction treatment for various periods of time. In FIG. 7, the abscissa axis represents a CO adsorbed amount (μL/g), and the ordinate axis represents a NOx conversion efficiency (%). FIG. 7 will be described. The most upper right point in the graph corresponds to the $Cu/Al_2O_3$ catalyst of FIG. 6A, subjected to reduction treatment for the shortest period of time, and, hereinafter, the period of time for reduction treatment extends with a decrease in NOx conversion efficiency. Then, the most lower left point in the graph relates to the $Cu/Al_2O_3$ catalyst subjected to reduction treatment for 50 hours and, therefore, corresponds to the $Cu/Al_2O_3$ catalyst of FIG. 6D. In addition, in FIG. 7, the NOx conversion efficiency of the $Cu/Al_2O_3$ catalyst increases as the CO adsorbed amount increases, and, the NOx conversion efficiency decreases with a reduction in CO adsorbed amount, that is, a certain correlation between a CO adsorbed amount and a NOx conversion efficiency was recognized.

Here, in the case of a base metal, such as Cu, different from the case of a precious metal, the particle diameter may not be able to be accurately calculated from a CO adsorbed amount, so data of a CO adsorbed amount is not converted to the particle diameter of Cu particles in FIG. 7. However, referring to the results of FIG. 7, the NOx conversion efficiency and the CO adsorbed amount decrease as the period of time for reduction treatment extends, and a certain correlation is recognized between the NOx conversion efficiency and the CO adsorbed amount. Therefore, when Cu particles on $Al_2O_3$ are exposed to a high-temperature reduction atmosphere for an extended period of time, the Cu particles on $Al_2O_3$ agglomerate to become large. For this reason, degradation of the NOx conversion activity of the $Cu/Al_2O_3$ catalyst is recognized.

[Study of Regeneration Treatment Conditions]

Figure 8A:
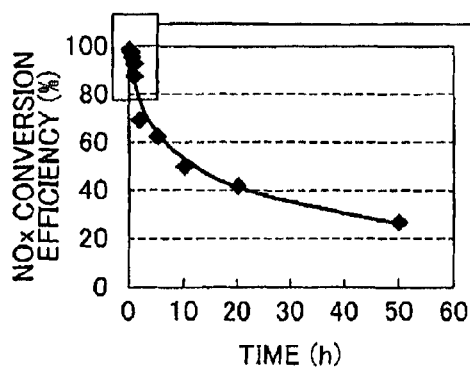
FIG. 8A and FIG. 8B are graphs that show the NOx conversion efficiency of a $Cu/Al_2O_3$ catalyst as a function of a reduction treatment time.
Figure 8B:
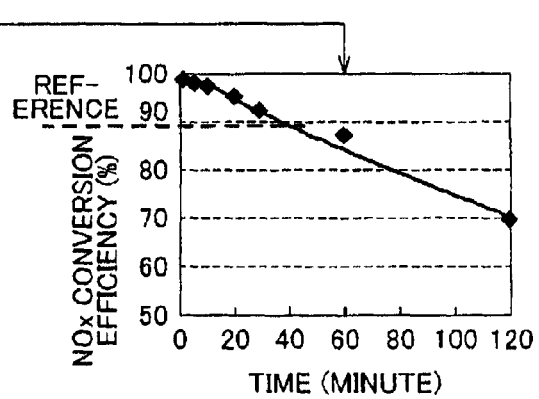

Next, the regeneration treatment conditions of a degraded Cu supported catalyst were studied as follows. First, FIG. 8A and FIG. 8B are graphs that show the data of FIG. 7 re-plotted with a period of time for reduction treatment as the abscissa axis and a plurality of additional experimental data. FIG. 8A is a graph that shows the NOx conversion efficiency of a $Cu/Al_2O_3$ catalyst as a function of a reduction treatment time, and FIG. 8B is a partially enlarged graph of FIG. 8A. Particularly, as shown in FIG. 8B, it is recognized that the $Cu/Al_2O_3$ catalyst maintains a high NOx conversion efficiency that exceeds 90% for about 30 minutes even at a high temperature of 700° C. in a reduction atmosphere. Then, subsequently, the temperature of the $Cu/Al_2O_3$ catalyst subjected to a reduction atmosphere at 700° C. for 30 minutes at the time of regeneration treatment was studied. The results are shown in FIG. 9.

Figure 9:
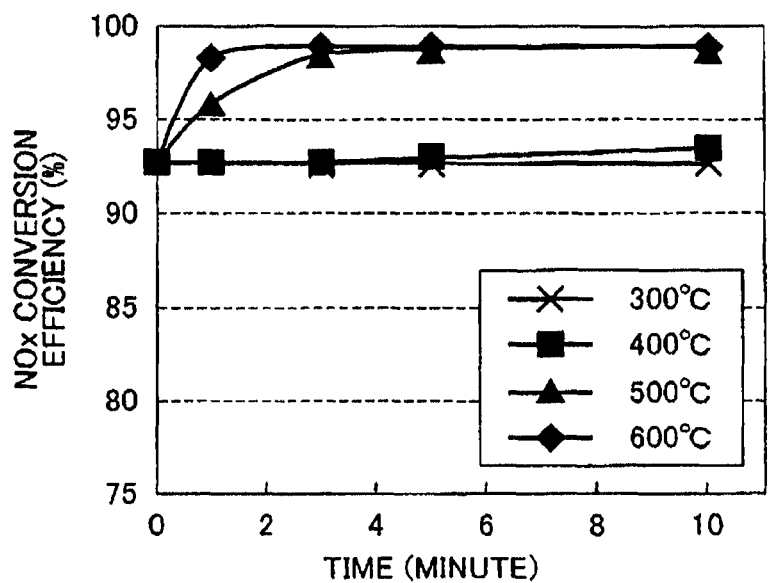
FIG. 9 is a graph that shows the NOx conversion efficiency of a $Cu/Al_2O_3$ catalyst after the $Cu/Al_2O_3$ catalyst is treated at 700° C. in a reduction atmosphere for 30 minutes and is then regenerated at temperatures of 300° C. to 600° C.

FIG. 9 is a graph that shows the NOx conversion efficiency of the $Cu/Al_2O_3$ catalyst that is subjected to a reduction atmosphere at 700° C. for 30 minutes and then $Cu/Al_2O_3$ catalyst is regenerated at temperatures of 300° C. to 600° C. Specifically, the $Cu/Al_2O_3$ catalyst subjected to reduction treatment in a 1% $H_2/N_2$ balance reduction atmosphere at 700° C. for 30 minutes was regenerated in air at temperatures of 300° C. to 600° C. for periods of time shown in FIG. 9. As is apparent form the results of FIG. 9, regeneration treatment at relatively low temperatures of 300° C. and 400° C. did not sufficiently recover the catalytic activity of the $Cu/Al_2O_3$ catalyst. However, regeneration treatment carried out at a temperature higher than or equal to 500° C. was able to regenerate the catalytic activity of the $Cu/Al_2O_3$ catalyst to a sufficiently high level in an extremely short period of time, that is, about 1 to 5 minutes, particularly, about 3 to 5 minutes.

Subsequently, the regeneration treatment conditions, that is, 500° C. for 5 minutes, which are effective to regenerate the degraded $Cu/Al_2O_3$ catalyst in FIG. 9, were applied to the $Cu/Al_2O_3$ catalysts shown in FIG. 8B to further study the degraded conditions of a regeneratable catalyst. The results are shown in FIG. 10.

Figure 10:
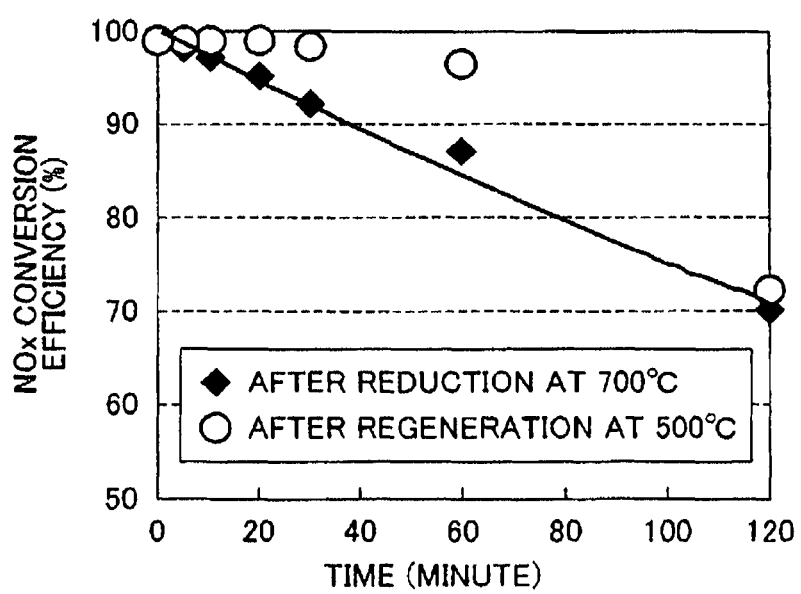
FIG. 10 is a graph that shows the NOx conversion efficiency of each of $Cu/Al_2O_3$ catalysts shown in FIG. 8B after the $Cu/Al_2O_3$ catalysts are regenerated.

FIG. 10 is a graph that shows the NOx conversion efficiency of each of the $Cu/Al_2O_3$ catalysts of FIG. 8B after being regenerated. Note that, for the sake of easy comparison, the data of FIG. 8B are plotted in FIG. 10 as-is. Referring to FIG. 10, for the $Cu/Al_2O_3$ catalysts subjected to treatment in a reduction atmosphere at 700° C. within 60 minutes, the $Cu/Al_2O_3$ catalysts were regenerated in an oxidation atmosphere at 500° C. for 5 minutes, and the NOx conversion performance of each $Cu/Al_2O_3$ catalyst was able to be recovered to a sufficiently high level.

The invention claimed is:
1. An exhaust gas control apparatus for an internal combustion engine, comprising:
at least one NOx purification catalyst that is arranged in an exhaust passage of the internal combustion engine and that is formed by supporting Cu on a catalyst carrier;
at least one degradation degree estimating unit that is used to estimate a degradation degree of the at least one NOx purification catalyst; and
an air-fuel ratio control unit that is used to adjust an air-fuel ratio of exhaust gas flowing into the at least one NOx purification catalyst, wherein
until the degradation degree of the at least one NOx purification catalyst, estimated by the at least one degradation degree estimating unit, reaches a predetermined degradation degree, the air-fuel ratio control unit adjusts the air-fuel ratio of the exhaust gas flowing into the at least one NOx purification catalyst to an air-fuel ratio richer than a stoichiometric air-fuel ratio, and
when the degradation degree of the at least one NOx purification catalyst, estimated by the at least one degradation degree estimating unit, exceeds the predetermined degradation degree, the air-fuel ratio control unit causes only air to flow into the at least one NOx purification catalyst so that the at least one NOx purification catalyst is regenerated.

2. The exhaust gas control apparatus according to claim 1, wherein the at least one NOx purification catalyst is regenerated at a temperature higher than or equal to 500° C.

3. The exhaust gas control apparatus according to claim 1, wherein
at least two of the NOx purification catalysts are provided,
the NOx purification catalysts are arranged in the exhaust passage of the internal combustion engine in parallel with each other and are connected to one common exhaust passage on a downstream side thereof, and
when one of the NOx purification catalysts is being regenerated, the other at least one NOx purification catalyst purifies NOx.

4. The exhaust gas control apparatus according to claim 1, wherein the at least one degradation degree estimating unit is a NOx sensor that is arranged in an exhaust passage downstream of the at least one NOx purification catalyst.

5. The exhaust gas control apparatus according to claim 1, further comprising:
at least one catalyst temperature detecting unit that is used to detect a temperature of the at least one NOx purification catalyst; and
at least one catalyst heating unit that is used to heat the at least one NOx purification catalyst, wherein
when any one of the at least one NOx purification catalyst is regenerated, the any one of the at least one NOx purification catalyst is heated by the at least one catalyst heating unit to a temperature higher than or equal to 500° C.

6. The exhaust gas control apparatus according to claim 1, further comprising:
an oxidation catalyst that is arranged in an exhaust passage downstream of the at least one NOx purification catalyst or in a common exhaust passage and that is used to oxidize and purify HC and CO; and
an air introducing unit that is arranged in the exhaust passage downstream of the at least one NOx purification catalyst or in the common exhaust passage and that is used to introduce air to the exhaust gas present upstream of the oxidation catalyst.

7. The exhaust gas control apparatus according to claim 6, wherein the oxidation catalyst is a catalyst formed by supporting Ag on a catalyst carrier.

8. An exhaust gas control method for an internal combustion engine in which at least one NOx purification catalyst formed by supporting Cu on a catalyst carrier is arranged in an exhaust passage of the internal combustion engine, comprising:
estimating a degradation degree of the at least one NOx purification catalyst;
until an estimated degradation degree of the at least one NOx purification catalyst reaches a predetermined degradation degree, adjusting an air-fuel ratio of exhaust gas flowing into the at least one NOx purification catalyst to an air-fuel ratio richer than a stoichiometric air-fuel ratio; and
when the estimated degradation degree of the at least one NOx purification catalyst exceeds the predetermined degradation degree, an air to fuel ratio control unit causes only air to flow into the at least one NOx purification catalyst leaner than the stoichiometric air-fuel ratio so that the at least one NOx purification catalyst is regenerated.

9. The exhaust gas control method according to claim 8, wherein the at least one NOx purification catalyst is regenerated at a temperature higher than or equal to 500° C.

10. The exhaust gas control method according to claim 8, wherein at least two of the NOx purification catalysts are provided, and the NOx purification catalysts are arranged in the exhaust passage of the internal combustion engine in parallel with each other and are connected to one common exhaust passage on a downstream side thereof, the exhaust gas control method further comprising:
when one of the NOx purification catalysts is being regenerated, purifying NOx by the other at least one NOx purification catalyst.

11. The exhaust gas control method according to claim 8, further comprising:
detecting a temperature of the at least one NOx purification catalyst, wherein when any one of the at least one NOx purification catalyst is regenerated, the any one of the at least one NOx purification catalyst is heated to a temperature higher than or equal to 500'C.

12. The exhaust gas control method according to claim 8, wherein an oxidation catalyst that is arranged in an exhaust passage downstream of the at least one NOx purification catalyst or in a common exhaust passage and that is used to oxidize and purify HC and CO is provided, the exhaust gas control method further comprising:
in the exhaust passage downstream of the at least one NOx purification catalyst or in the common exhaust passage, introducing air to the exhaust gas present upstream of the oxidation catalyst.

* * * * *